J. Whitcomb,
Railroad Switch,
№ 14,264.
Patented Feb. 12, 1856.
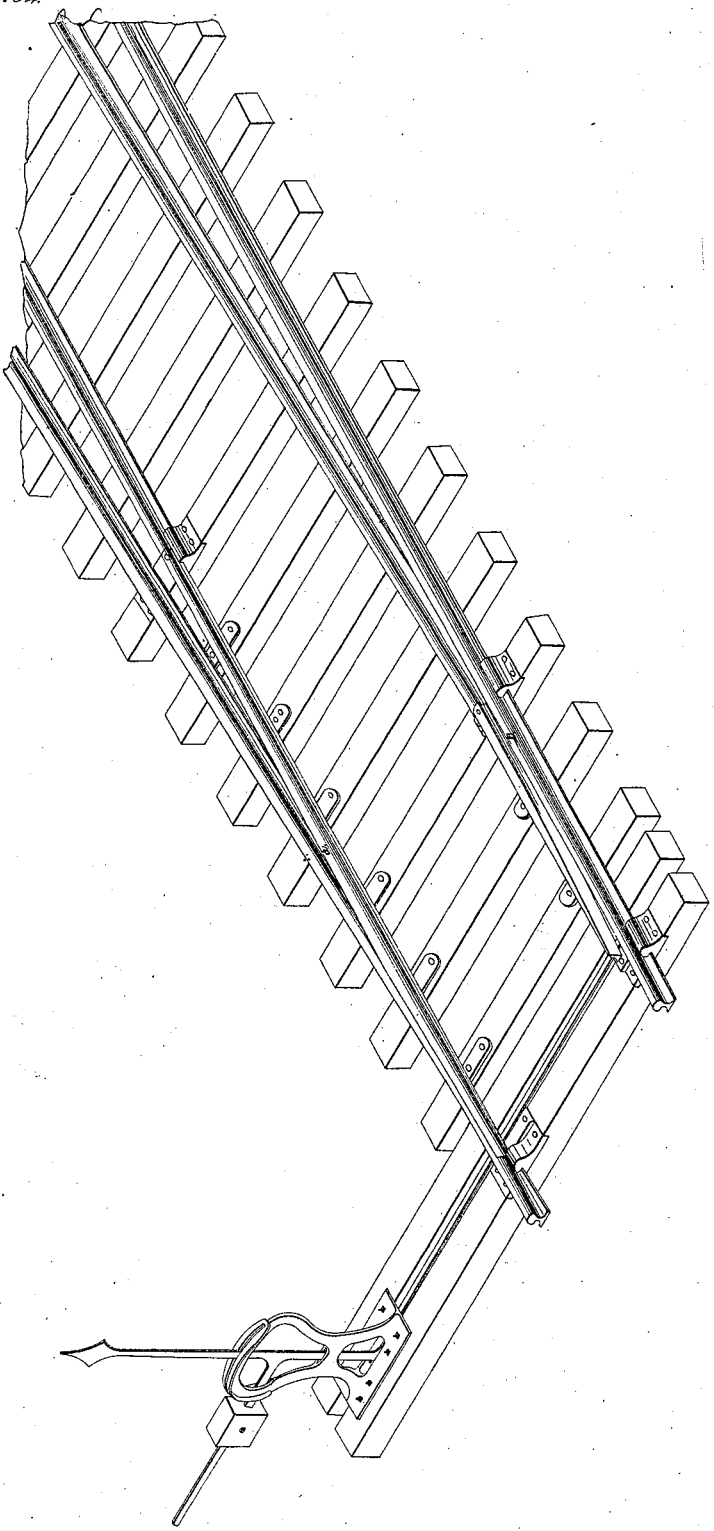

UNITED STATES PATENT OFFICE.

JAMES WHITCOMB, OF DETROIT, MICHIGAN.

RAILROAD-SWITCH.

Specification of Letters Patent No. 14,264, dated February 12, 1856.

*To all whom it may concern:*

Be it known that I, JAMES WHITCOMB, of the city of Detroit, county of Wayne, State of Michigan, have invented a new Self-Adjusting Safety-Switch for Railroads; and I do hereby declare that the following is a full description thereof, reference being had to the accompanying drawing and to the letters of reference marked thereon.

The nature of my invention consists in making the two rail bars of a switch of unequal lengths and connecting them together so that when the pressure of the flange of the wheel acts on the outside of the long switch bar (when a car is passing out of a switch) the switch bars will be moved to the right position to allow the cars to pass onto the main track. The switch bars may be regulated and held to their place either by a spring or counterbalance weight.

To enable mechanics and engineers skilled in the construction of railroads to construct my self adjusting safety switch I do hereby declare that the following is a full and clear description of the manner of constructing and operating the same, reference being had to the annexed drawings, making a part of this specification, which is a perspective view of the switch, letters *a* and *b* denoting the switch bars.

In constructing my self adjusting safety switch I use a long and a short switch bar the points of the bars to be opposite each other and connected together with a strong iron rod, the heads of the bars secured to form a pivot on which they turn the length of the bars to be governed by the angle the switch makes with the main line, the long bar being about twice the length of the short bar. On the outside of the long bar at, *a*, in the annexed drawing will be an enlargement and (when the curvature will admit) a projecting flange for the car wheels to press against when a car is passing out of the switch, the form of this enlargement of the switch to be such that the wheels pressing against it will move the switch bars over, and allow the short bar to move to its open position before the weight of the wheel rests upon this short switch bar. After the cars have passed the switch the bars readjust themselves either by a counterweight or spring, so that the track is at all times in position for a train to pass in either direction, and a train cannot get off the track while the switch is in working order. To allow a train to pass onto a branch in the reverse order or to back onto the switch the switch will be operated in the usual way with a lever moved by a switchman. On his leaving the switch it will readjust itself as before described.

The enlargement should be applied laterally to the longest switchrail, and be made of such curvilinear shape that the maximum thickness of the long rail should correspond to the articulation of the short rail, or to any point of the branchrail above that articulation so that the rim of one wheel of the forward truck shall have passed the greatest thickness of the said enlargement before the other wheel reaches the short switchbar. The greatest width or thickness of the enlargement should be made corresponding to the widest opening of the short bar, and be calculated in such a manner as to produce the perfect closing of that switchbar by the interposition of the rim of the wheel, between the enlargement of the long bar and the rail upon which, the just-mentioned wheel runs.

Having thus fully described my improvement, what I claim and desire to secure by Letters Patent is—

The enlargement substantially as described, of the long switch rail, when connected with a short switch bar.

JAMES WHITCOMB.

Witnesses:
JUL. C. LAASS,
R. F. HIGHAM.